June 3, 1930.  C. I. LONGENECKER  1,762,023
SAWING MACHINE
Filed Sept. 16, 1927  3 Sheets-Sheet 2

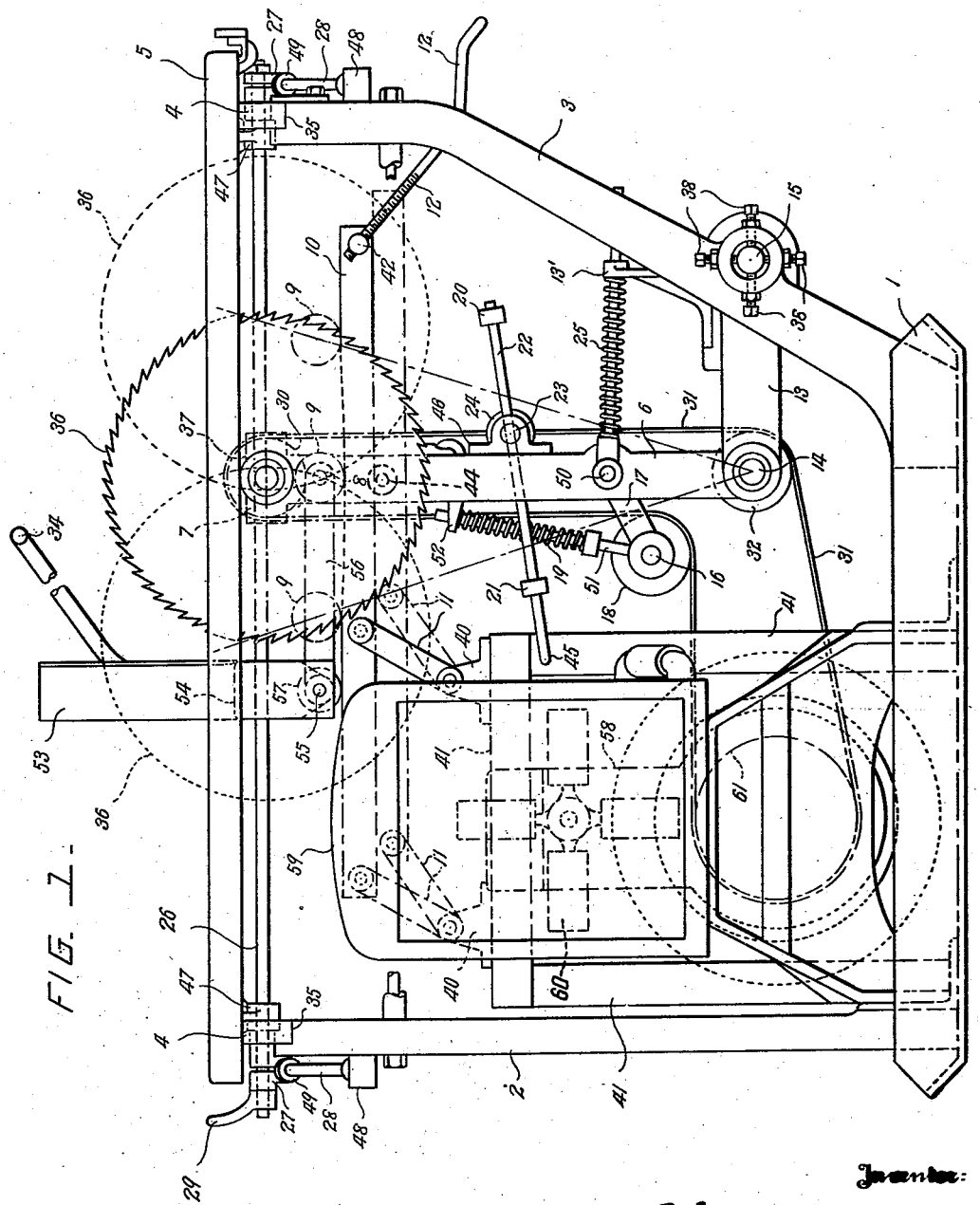

Inventor:
CHARLES I. LONGENECKER
By John S. Barker
Attorney.

June 3, 1930.  C. I. LONGENECKER  1,762,023
SAWING MACHINE
Filed Sept. 16, 1927   3 Sheets-Sheet 3

Inventor:
CHARLES I. LONGENECKER
By John S. Barker
Attorney

Patented June 3, 1930

1,762,023

UNITED STATES PATENT OFFICE

CHARLES I. LONGENECKER, OF MILWAUKEE, WISCONSIN, ASSIGNOR TO CHAIN BELT COMPANY, OF MILWAUKEE, WISCONSIN, A CORPORATION OF WISCONSIN

SAWING MACHINE

Application filed September 16, 1927. Serial No. 219,986.

The object of the present invention is to produce a sawing machine that is light in weight, rigid and compact in construction, with a capacity for doing a large variety of work, and having features of novelty which will be hereinafter set forth.

In the accompanying drawings, wherein a preferred embodiment of my invention is illustrated, Fig. 1 is a side view of the machine.

Figure 4:
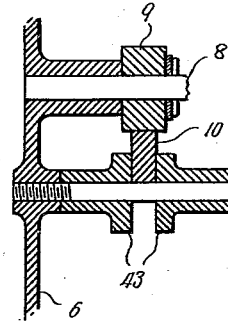
Fig. 4 is a transverse sectional detail view illustrating the means for clamping a saw carrying arm to the rail that guides its movements.

In the drawings 1 indicates the base of the framework of the machine, preferably of angle iron suitably fabricated. 2 indicates the rear frame piece, and 3 the front frame piece, these being preferably drawn in or tapered toward their upper ends, and shaped to form the curved bearings 35, in which are supported the segmental bearing pieces or quadrants 4, carried by the sawing table 5. The centers of the bearings 35 are in the plane of the saw 36, which extends through an opening 39 in the table 5.

The saw is supported upon an arbor 7, mounted in bearings 37 at the upper end of the saw arm 6, which is, at its lower end, pivotally supported upon a shaft 14 mounted in an angle lever 13 that turns upon a shaft 15, supported for limited adjustment in the front end frame piece 3. The shaft 15 is secured in place at each end by adjusting screws 38, which provide for the proper alignment of the shaft, so that its axis may be at right angles to the center line of the saw slot 39 and to the top of the table 5 when adjusted to its normal position—that is with its working face at right angles to the plane of the saw.

In the upper end of the saw arm 6 is supported a shaft 8, on which is mounted a roller 9 that bears upon a track 10. The shaft is preferably located directly below the arbor 7, and the roller 9 is in a plane to one side of the saw. The track 10 is preferably a bar of suitable shape and construction, supported by a pair of parallel links 11, pivotally supported in brackets 40 mounted on the top of an inner frame 41. The purpose of the track 10 is to cause the saw, as it is reciprocated backward and forward through the slot 39, to move on lines that are parallel, or closely approximating parallel, with the plane of the saw table 5. An ideal location of the roller 9 would be with its axis in alignment with that of the saw arbor 7 and the surface of the bar on which the roller 9 runs parallel with the face of the saw table. But for construction purposes it is much more desirable to arrange the roller 9 below the saw arbor, as represented in the drawings, and when thus arranged should the bar 10 be parallel with the working face of the saw table there will be a slight dip in the saw at the ends of its backward and forward movements. While this would be slight, I prefer to make compensation therefor by slightly curving the surface of the bar 10, with which the roller 9 engages, to insure that the backward and forward movements of the saw shall be on straight lines. These movements of the saw are maintained by the parallel links 11, no matter to what vertical position the track 10 may be adjusted, so that the extent to which the cutting portion of the saw is above the working surface of the table shall be constant throughout the entire travel of the saw, so long as the adjustment of the track is not changed. The straight line movement of the saw, determined by the employment of the track 10 and the roller traveling thereon, permits a considerably larger timber to be cut for a given vertical adjustment of the saw than when the saw moves on a curved path, as is usually the case.

In order to effect adjustment of the track and thus cause a raising or a lowering of the saw, as may be required by the work to be performed, I employ a screw shaft 12, mounted for rotation in the front end frame 3, and working in a nut 42 carried by the track. A spring 25, bearing at one end against a suitable abutment carried by the saw arm 6 and at its other end against the upwardly extending arm 13' of the angle lever 13, operates to move the saw arm toward the rear of the machine, which is its normal position when the saw is inactive. It may be drawn forwardly to effect a cut, by means of a handle 34, or a pedal mechanism not shown.

In order to lock the saw arm to hold the saw in a fixed working position, I may employ clamps 43 Fig. 4 operated by a rod 44 supported in the saw arm, which when moved toward each other grip the supporting bar 10 and hold it and the saw in fixed position, as is required for rip sawing. The means for supporting and adjusting the saw which have been described permit it to be set to any vertical position, within the limits of movements of the bar 10, and to any horizontal position, within the limits of the movements of the arm 6, and there secured.

In order to limit the forward and backward movements of the saw arm, I employ stop collars, 20, 21, mounted upon a rod 22, one end of which is pivotally supported in the frame 41, at 45. The rod 22 passes through a pin or short shaft 23 that is supported so as to turn freely in a bearing 46 secured to the saw arm 6. A set screw, to which is secured a hand wheel 24, is arranged to act upon the rod 22 and prevent its sliding freely through the shaft 23, thus locking these two parts together, and causing the saw to be held stationary in a desired position relative to the table, for use in ripping or other work that requires the revolving saw to remain in fixed position.

The splitter or spreader 53 employed in rip sawing is supported by a bracket 54 at the outer end of an arm 56 that is pivotally supported on the shaft 8. A shaft 55 is suitably supported in the outer end of the arm 56 and carries a roller 57 adapted to travel upon the track 10. The arrangement described insures that the splitter may be supported close to the edge of the saw and that its edge may be maintained in a plane at right angles to the plane of the saw table, at all times and whatever may be the position of the saw as determined by its vertical adjustment in the slot 39 or its backward and forward movements therein. It is, of course, understood that the splitter moves as the saw is adjusted, and that it is used only for rip sawing, being removed by separating the arm 56 from the shaft 8 when the saw is used for cross cutting.

Figure 2:
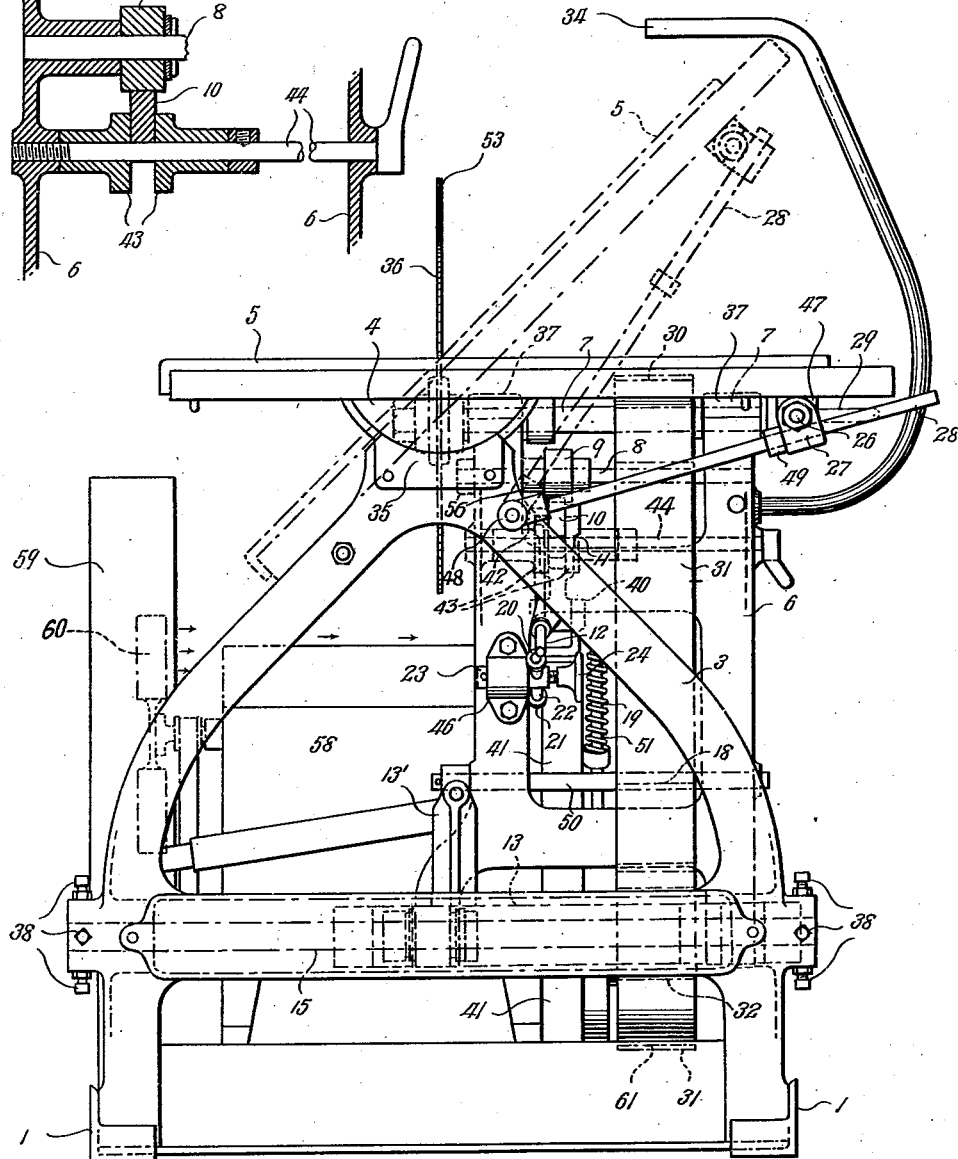
Fig. 2 is a front end view.
Figure 3:
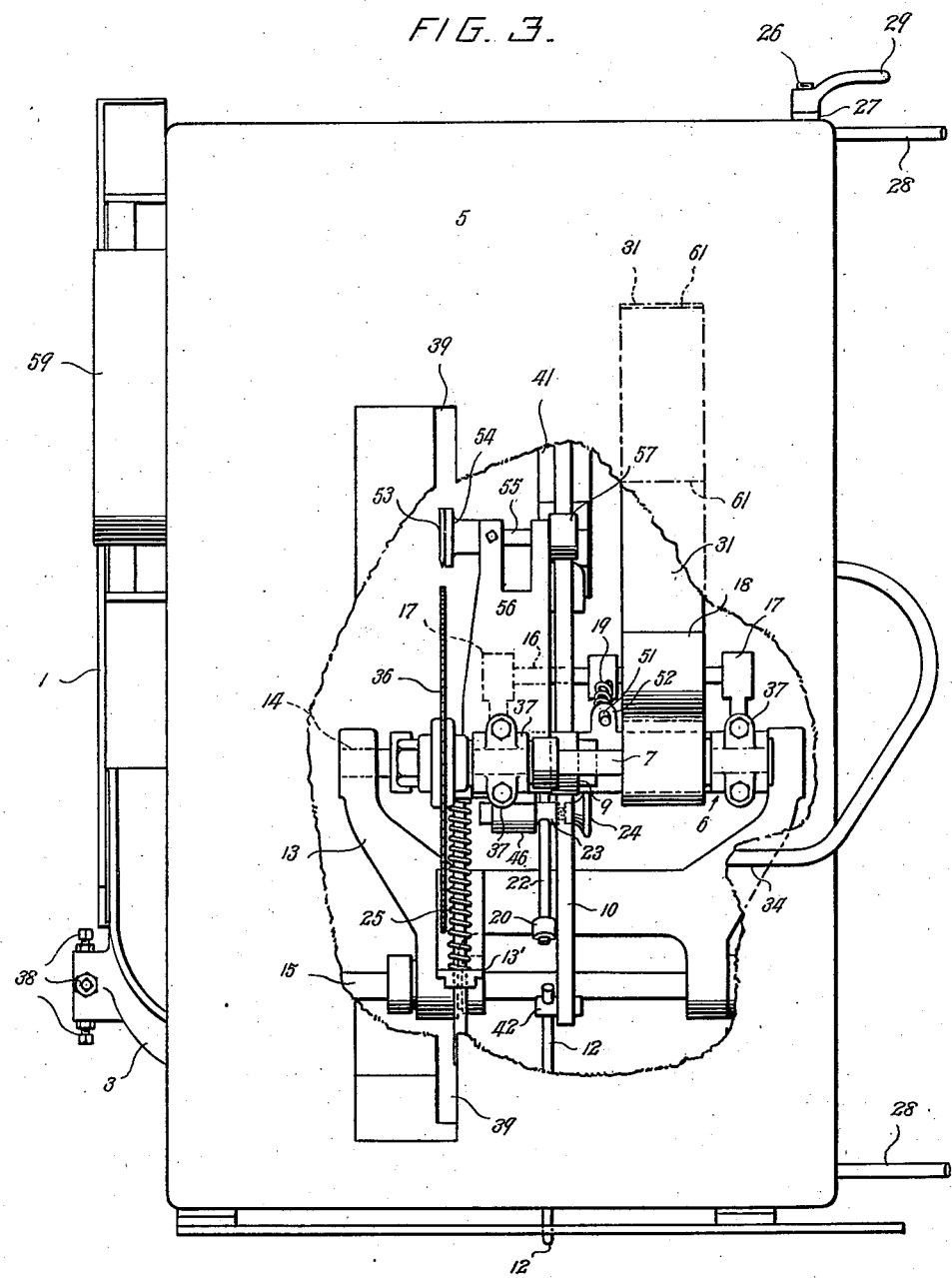
Fig. 3 is a top plan view.

The table 5 is adapted to be adjusted to an inclined position relative to the saw, as represented by dotted lines in Fig. 2, when the material being operated upon is to be cut on a bevel, this being permitted by the segments 4 turning in the bearings 35. In order to hold the table in the position to which it may be adjusted, I have arranged the following mechanism. 26 represents a rod or shaft that extends across the table, being mounted in brackets 47, depending from the under side of the table. This shaft carries at its ends the split clamps 27 that are adapted to be closed through the action of lever nuts 29. Rods 28, at the opposite ends of the table, are pivotally supported at 48 in the end frame pieces 2 and 3, and pass through openings provided for them in the split clamps 27. When the clamps are open they may slide freely upon the rods 28 permitting adjustment of the table from one position to another, as indicated by full and dotted lines in Fig. 2. After the desired adjustment has been effected the clamps may be tightened, through the action of the lever nuts, and the table will be held securely in the desired inclined position. Stop collars 49 are secured fast upon the rods 28 and serve to determine the horizontal or normal position of the table when the split clamp nuts 27 come into engagement therewith.

The saw is operated by a motor 58, and I prefer to use an internal combustion engine for this purpose supported directly below the table 5 and within the inner frame 41. This engine is provided with a cooling radiator 59 of any well known or desired construction, with which is associated a fan 60. The fan is so located as to blow the dust and other light material incident to the use of the saw away from the motor. This arrangement makes a very compact, self-contained, portable machine. The motor is provided with a belt pulley 61, with which engages a driving belt 31, that passes to and engages with a pulley 30 on the arbor of the saw. In its course between these pulleys the belt passes the idler pulleys 18 and 32 where the belt turns.

The pulley 18 is mounted upon a shaft 16 supported in an arm 17 that is hung upon a shaft 50 carried by the saw arm 6. A coiled spring 19, surrounding a shaft 51 connected at one end with the freely swinging arm 17, and acting at its other end against an abutment 52 carried by the saw arm, acts to move the arm and the pulley 18 that it carries in a downward direction, thus maintaining the proper tension upon the belt 31. The pulley 32 is supported upon the shaft 14.

It will be seen, from the foregoing description, taken in connection with the drawings, that the machine is simple and compact in construction and is yet capable of performing a great variety of operations. The saw moves backward and forward along straight lines and may be easily adjusted vertically by raising or lowering the supporting bar 10 along which the saw carriage travels. The saw may be held in fixed position, as has been described, for ripping and analogous work. The saw table may be set at various angles and securely held when thus adjusted, the mechanisms for effecting such adjustments and operations being simple and easily operated and not liable to get out of order.

What I claim is:

1. In a sawing machine the combination of a circular saw, a saw table, an arm in which the saw is supported movable lengthwise of the table, a roller carried by the saw arm, a supporting bar upon which the roller rests and by which the movements of the saw on lines parallel with the working surface of the table are directed, parallel links by which the supporting bar is held, and means for adjusting the bar and links to vary the extent to which the cutting portion of the saw extends beyond the face of the table.

2. In a sawing machine the combination of a supporting frame, a saw table, a circular saw, the working portion of which extends through a longitudinal slot in the saw table, a movable arm in which the arbor of the saw is supported, a roller carried by the saw arm, a supporting bar having a face upon which the said roller rests arranged to direct the saw on lines parallel with the working surface of the table, an inner or supplemental frame, parallel links supported by the said inner frame arranged to sustain the supporting bar, and means for adjusting the supporting bar to raise or lower the saw relative to the saw table.

3. In a sawing machine the combination of a circular saw, a table formed with a longitudinal slot through which the operating portion of the saw extends, an arm in which the saw is supported movable to cause the saw to reciprocate in the said slot, a roller carried by the saw arm, a supporting bar having a face on which the roller rests and along which it may move, means for adjusting the supporting bar toward and from the saw table, and means for securing the saw arm to the supporting bar, the parts operating as described to hold the saw securely in a position of operation that may be changed both vertically and longitudinally.

4. In a sawing machine the combination of a circular saw, an arm in the upper end of which the arbor of the saw is supported, an angular lever to one arm of which the lower end of the saw arm is pivotally supported, and a spring interposed between the other arm of the angular lever and the saw arm operating to move the saw to its normal inactive position.

5. In a sawing machine, the combination of a circular saw, a saw table, an arm in the upper end of which the arbor of the saw is supported and pivoted at its lower end, a roller carried by the arm located below the saw arbor, a supporting bar with a face parallel with the surface of the saw table on which the said roller moves, whereby the saw is caused to travel on lines parallel with the surface of the table upon being reciprocated, a belt pulley on the axis of the saw arbor through which the saw is revolved and an idler pulley supported by the saw arm near its lower end.

6. The combination stated in claim 5 wherein the saw-arbor-supporting roller and the idler belt pulley are all in line along the saw arm.

7. The combination stated in claim 5, including also a lever to which the lower end of the saw arm is pivotally connected, the idler belt pulley and the pivot uniting the saw arm and its supporting lever being coaxial.

CHARLES I. LONGENECKER.